United States Patent [19]
Cherabuddi et al.

[11] Patent Number: 5,761,708
[45] Date of Patent: Jun. 2, 1998

[54] APPARATUS AND METHOD TO SPECULATIVELY INITIATE PRIMARY MEMORY ACCESSES

[75] Inventors: Rajasekhar Cherabuddi, Sunnyvale; Anuradha Moudgal, Fremont; Kevin Normoyle, Santa Clara, all of Calif.

[73] Assignee: Sun Microsystems, Inc., Mountain View, Calif.

[21] Appl. No.: 658,874

[22] Filed: May 31, 1996

[51] Int. Cl.[6] .......................... G06F 12/08; G06F 13/18
[52] U.S. Cl. .................... 711/118; 711/158; 711/168; 395/877
[58] Field of Search .................... 395/495, 445, 395/877, 485

[56] References Cited

U.S. PATENT DOCUMENTS

| | | | |
|---|---|---|---|
| 3,896,419 | 7/1975 | Lange et al. | 711/129 |
| 4,847,758 | 7/1989 | Olson et al. | 711/133 |
| 4,858,111 | 8/1989 | Steps | 711/144 |
| 5,210,845 | 5/1993 | Crawford et al. | 711/128 |
| 5,325,508 | 6/1994 | Parks et al. | 711/118 |
| 5,553,270 | 9/1996 | Rosenbluth | 711/142 |

*Primary Examiner*—Eddie P. Chan
*Assistant Examiner*—Reginald G. Bragdon
*Attorney, Agent, or Firm*—William S. Galliani; Flehr Hohbach Test Albritton & Herbert LLP

[57] ABSTRACT

A central processing unit with an external cache controller and a primary memory controller is used to speculatively initiate primary memory access in order to improve average primary memory access times. The external cache controller processes an address request during an external cache latency period and selectively generates an external cache miss signal or an external cache hit signal. If no other primary memory access demands exist at the beginning of the external cache latency period, the primary memory controller is used to speculatively initiate a primary memory access corresponding to the address request. The speculative primary memory access is completed in response to an external cache miss signal. The speculative primary memory access is aborted if an external cache hit signal is generated or a non-speculative primary memory access demand is generated during the external cache latency period.

14 Claims, 8 Drawing Sheets

APPARATUS AND METHOD TO SPECULATIVELY INITIATE PRIMARY MEMORY ACCESSES

BRIEF DESCRIPTION IF THE INVENTION

This invention relates generally to accessing a primary memory in a computer. More particularly, this invention relates to a central processing unit with an external cache controller and a primary memory controller that are used to speculatively initiate primary memory accesses in order to improve average primary memory access times.

BACKGROUND OF THE INVENTION

FIG. 1 is an illustration of a general purpose computer 20. The computer 20 includes a central processing unit (CPU) 22. The CPU 22 executes instructions of a computer program. Each instruction is located at a memory address. Similarly, the data associated with an instruction is located at a memory address. The CPU 22 accesses a specified memory address to fetch the instruction or data stored there.

Most CPUs include an on-board memory called a cache. The cache stores a set of memory addresses and the instructions or data associated with the memory addresses. If a specified address is not in the internal, or L1 cache, then the CPU 22 looks for the specified address in an external cache, also called an L2 cache 24. The external cache 24 has an associated external cache controller 26.

If the address is not in the external cache 24 (a cache miss), then the external cache 24 requests access to a system bus 28. When the system bus 28 becomes available, the external cache 24 is allowed to route its address request to the primary memory 30. The primary memory 30 has an associated memory controller 32.

FIG. 2 illustrates a memory controller 32 and its associated primary memory 30. The memory controller 32 includes an address queue 50 to store address requests received from the system bus 28. An address from the queue 50 is applied to the bus 52, which routes the address to a row decoder 54 and a multiplexer 56. A strobe control circuit 58 is used to enable either the row decoder 54 or the multiplexer 56. In particular, the strobe control circuit 58 generates a Row Access Strobe (RAS) signal on line 60 or a Column Access Strobe (CAS) signal on line 62.

When an address and the RAS signal are applied to the row decoder 54, the row decoder 54 specifies a row of values in a memory array 64. The row of values, also called a memory page, is then passed into a set of latches 66. Selected columns from the row (or page) of data are then specified with the address signal. That is, a subsequent address signal is used to specify selected columns in the row. The subsequent address signal is used as a multiplexer select signal, enabled by the CAS signal. Thereafter, the multiplexer 56 generates a data output signal on an output bus 68.

The foregoing operation is more fully appreciated with reference to FIG. 3. Waveform 70 illustrates a row address being asserted, followed by a set of column addresses. These signals are applied to the bus 52 of FIG. 2. The same bus 52 is used for both the row and column address in order to save package pins and thereby reduce package costs. The row address (Row Addr) is routed to the row decoder 54 as the RAS signal is deasserted, as shown with the waveform 72 going from high to low. The combination of the row address and the deasserted RAS signal allows the row decoder 54 to access a row in the memory array 64, resulting in the row being driven into the latches 66.

Note that the RAS signal is deasserted after the row address is launched. This time delay is for the purpose of allowing the row address to reach the row decoder. Thus, it can be appreciated with reference to FIG. 3 that there is a delay involved with launching a row address. It would be highly desirable to improve primary memory access times by eliminating this delay.

After a row of values is driven into the latches 66, a first set of data is read from the latches 66 with the multiplexer 56, as a first column address and a deasserted CAS signal is received at the multiplexer 56. The first deassertion of the CAS signal is shown with the waveform 74. The first deassertion of the CAS signal coincides with the timing of the first column address, as shown in FIG. 3. This operation results in a first set of output data being driven onto the bus 68. The first set of output data is shown with the waveform 76. The RAS signal continues to be deasserted, shown with the waveform 72, as the subsequent column address signals, shown with the waveform 70, are applied to the multiplexer 56. The subsequent column address signals are timed to coincide with the deassertion of the CAS signal, as shown with the waveform 74. This operation produces three subsequent sets of data. Depending upon the system, the data of the waveform 76 may not be returned until after the second, third, or fourth column address is asserted. A relatively quick return of data is illustrated for convenience.

Note that after the last column address is sent, the RAS signal is asserted (goes high) once again. If a new address is to be fetched from primary memory, the RAS signal must be deasserted again, and the foregoing processing must be repeated.

Returning now to FIG. 1, the data output from the primary memory 30 is applied to the system bus 28. It is then stored in the external cache 24 and is passed to the CPU 22 for processing. The processing described in reference to FIGS. 1–3 must be performed for every address request. Indeed, if the address request is not found in the primary memory 30, similar processing is performed by an input/output controller 34 associated with a secondary memory 36.

As shown in FIG. 1, there are additional devices connected to the system bus 28. For example, FIG. 1 illustrates an input/output controller 38 operating as an interface between a graphics device 40 and the system bus 28. In addition, the figure illustrates an input/output controller 42 operating as an interface between a network connection circuit 44 and the system bus 28.

The multiple connections to the system bus 28 result in a relatively large amount of traffic. Consequently, there are delays associated with passing information on the system bus 28. System bus 28 delays discourage optimizations of the memory controller 32 that require the passing of information to the CPU 22. Optimization of the memory controller 32 that require the passing of information to the CPU 22 are also discouraged since they typically involve additional signal lines. It is important to reduce the number of pins associated with a CPU package, thus using additional signal lines for memory controller optimizations is not a practical option.

Despite the obstacles preventing improvements to primary memory controllers, it is important to realize improvements in primary memory access times. Primary memory latencies are not improving as much as CPU speeds. Thus, primary memory latencies are increasingly reducing the execution performance of CPUs.

In view of the foregoing, it would be highly desirable to improve the performance of a primary memory controller.

The performance improvements should not involve additional traffic on the system bus 28, nor should they require additional signal lines into the CPU 22.

SUMMARY OF THE INVENTION

A central processing unit with an external cache controller and a primary memory controller is used to speculatively initiate primary memory access in order to improve average primary memory access times. The external cache controller processes an address request during an external cache latency period and selectively generates an external cache miss signal or an external cache hit signal. If no other primary memory access demands exist at the beginning of the external cache latency period, the primary memory controller is used to speculatively initiate a primary memory access corresponding to the address request. The speculative primary memory access is completed in response to an external cache miss signal. The speculative primary memory access is aborted if an external cache hit signal is generated or a non-speculative primary memory access demand is generated during the external cache latency period.

The speculative initiation of primary memory accesses reduces average primary access times. The described control criteria prevents speculative primary memory accesses from delaying the processing of non-speculative primary memory accesses. The enhanced primary memory access times are achieved without additional traffic on the system bus and without special package pins.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 4:
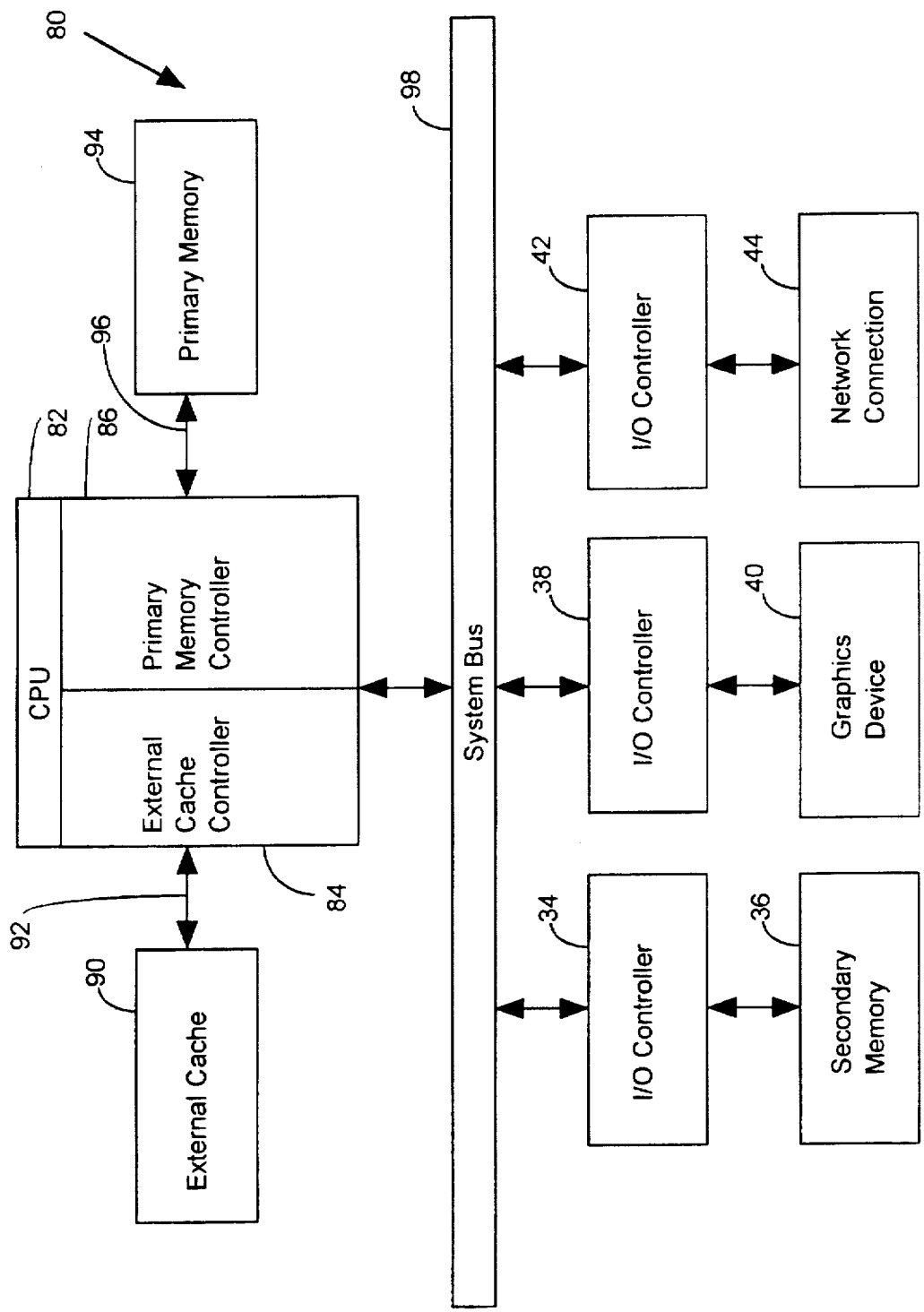
FIG. 4 illustrates a general purpose computer incorporating a central processing unit in accordance with the present invention.

FIG. 4 illustrates a computer 80 constructed in accordance with one embodiment of the invention. The computer 80 includes a central processing unit (CPU) 82 with an external cache controller 84 and a primary memory controller 86. The external cache controller 84 is connected to an external cache 90 via an external cache bus 93. Similarly, the primary memory controller 86 is connected to a primary memory 94 via a primary memory bus 96.

The first noteworthy aspect of the invention is that the CPU 82 has an on-board external cache controller 84 and primary memory controller 86. This topology is in contrast to the external cache controller 26 and primary memory controller 32 of FIG. 1. The close coupling of the external cache controller 84 and the primary memory controller 86 on the CPU 82 facilitates primary memory controller 86 optimizations in accordance with the invention. That is, the disclosed CPU topology allows for primary memory controller 86 improvements that do not add to traffic on the system bus 96, nor do they require dedicated signal lines into the CPU 82.

Figure 1:
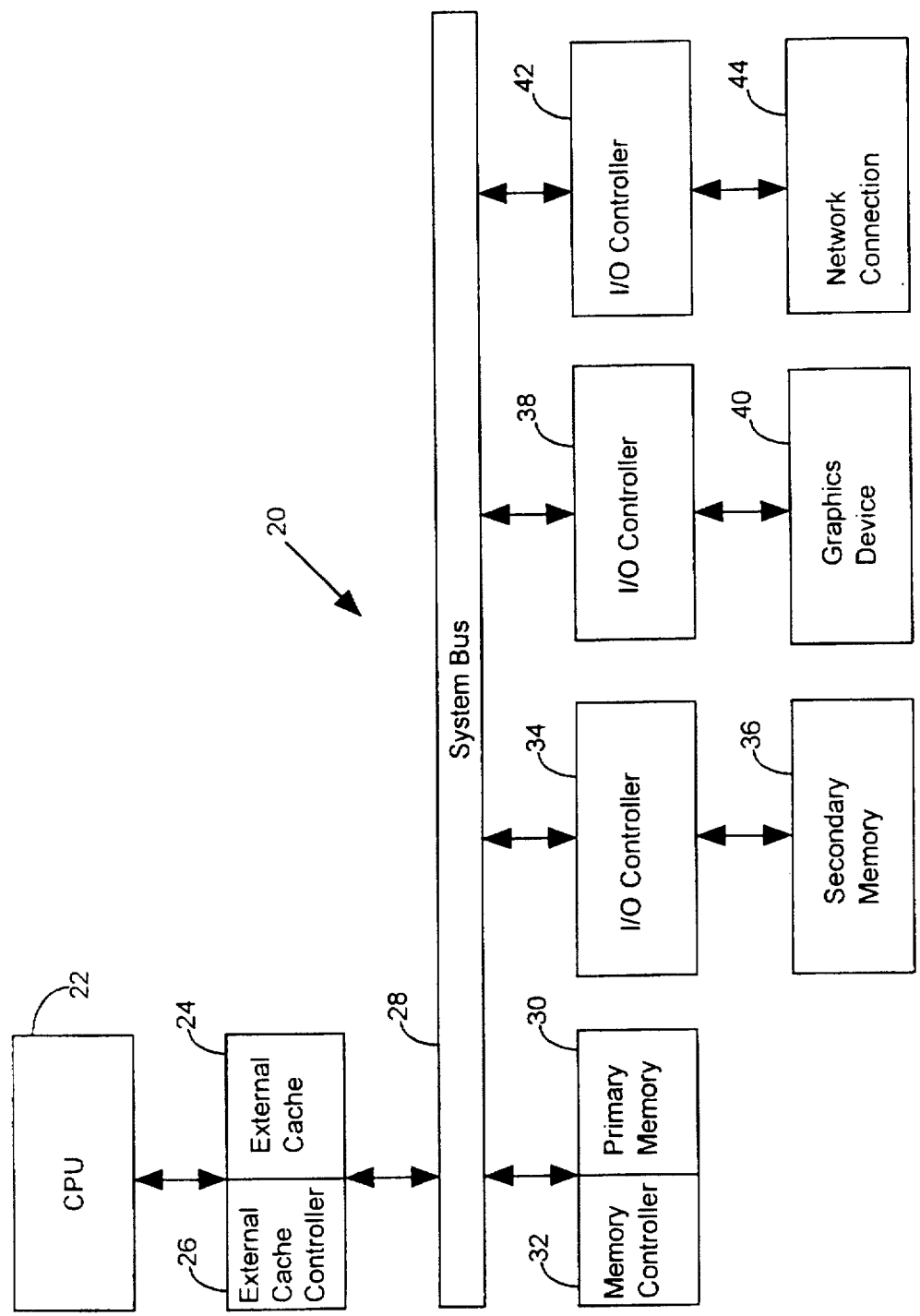
FIG. 1 illustrates a general purpose computer in accordance with the prior art.

The remaining elements shown in FIG. 4 are consistent with those shown in FIG. 1. Thus, they will not be discussed further. Instead, attention turns to the operation of the CPU 82 of the invention.

Figure 2:
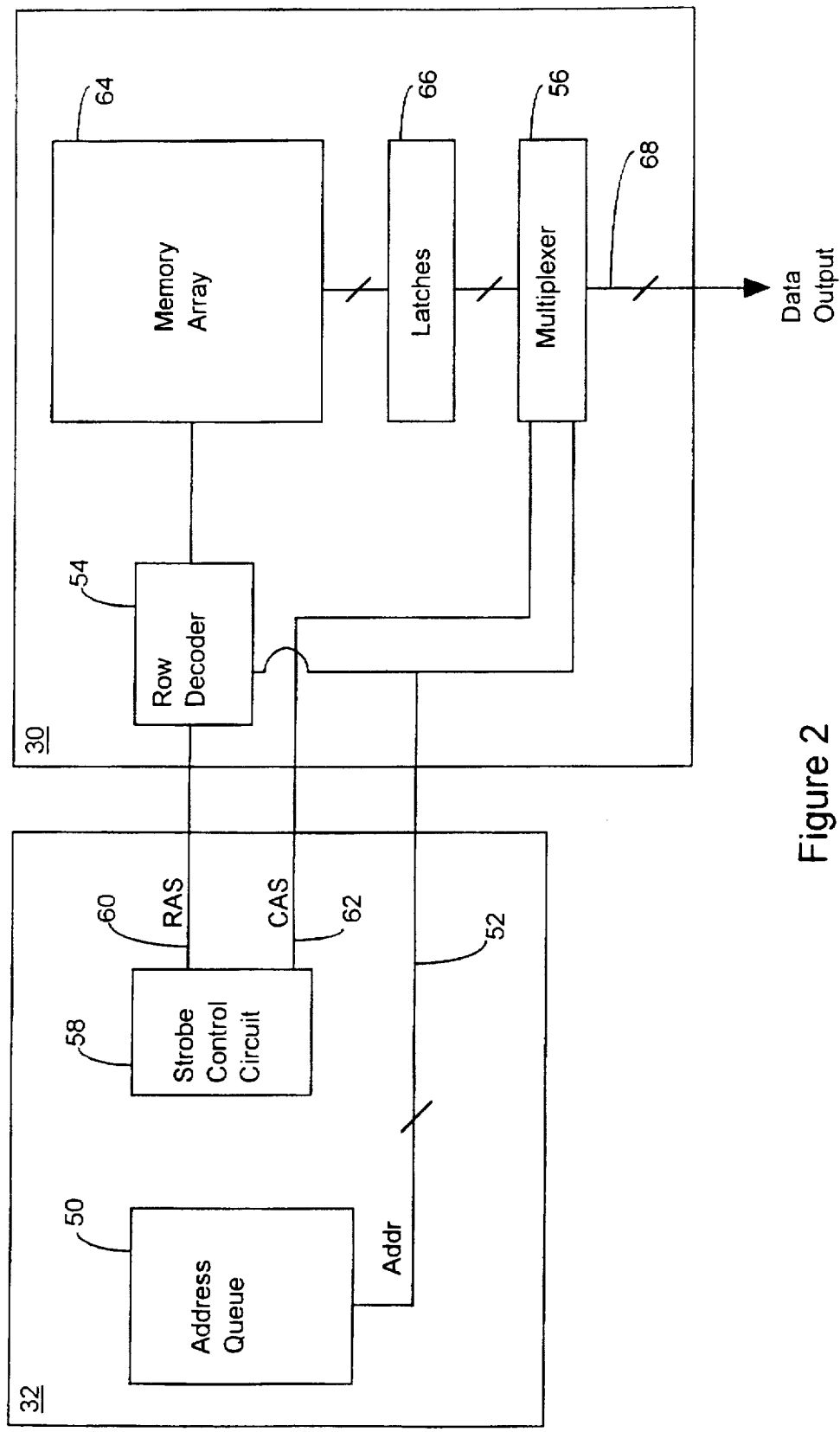
FIG. 2 illustrates a primary memory controller and a primary memory in accordance with the prior art.
Figure 3:
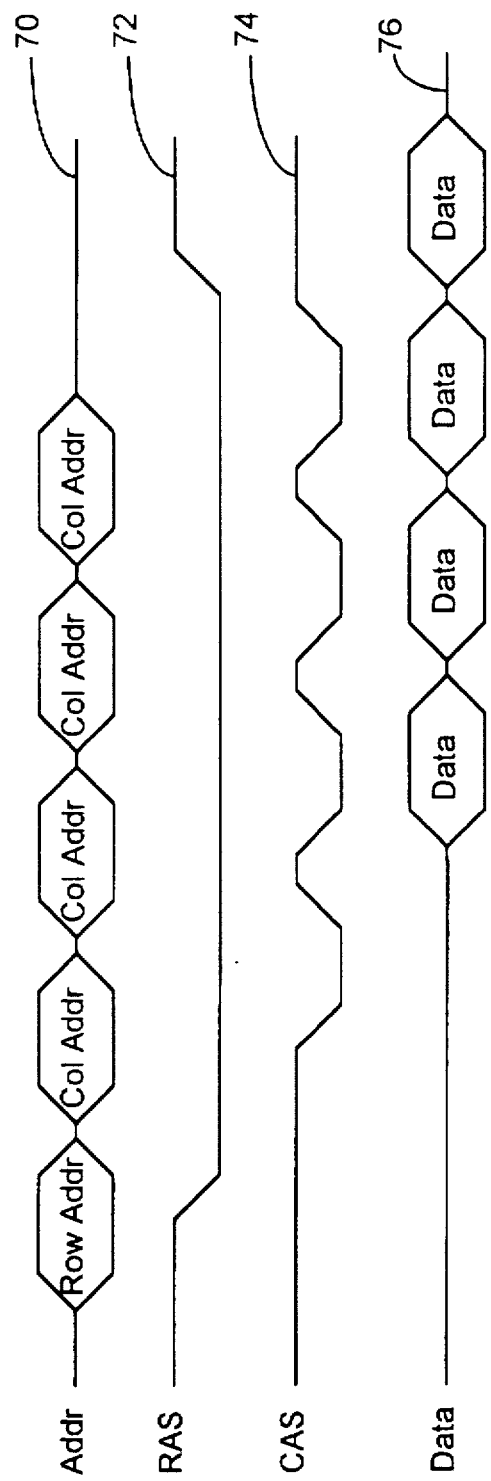
FIG. 3 is a set of waveforms illustrating the operation of the circuit of FIG. 2.
Figure 5:
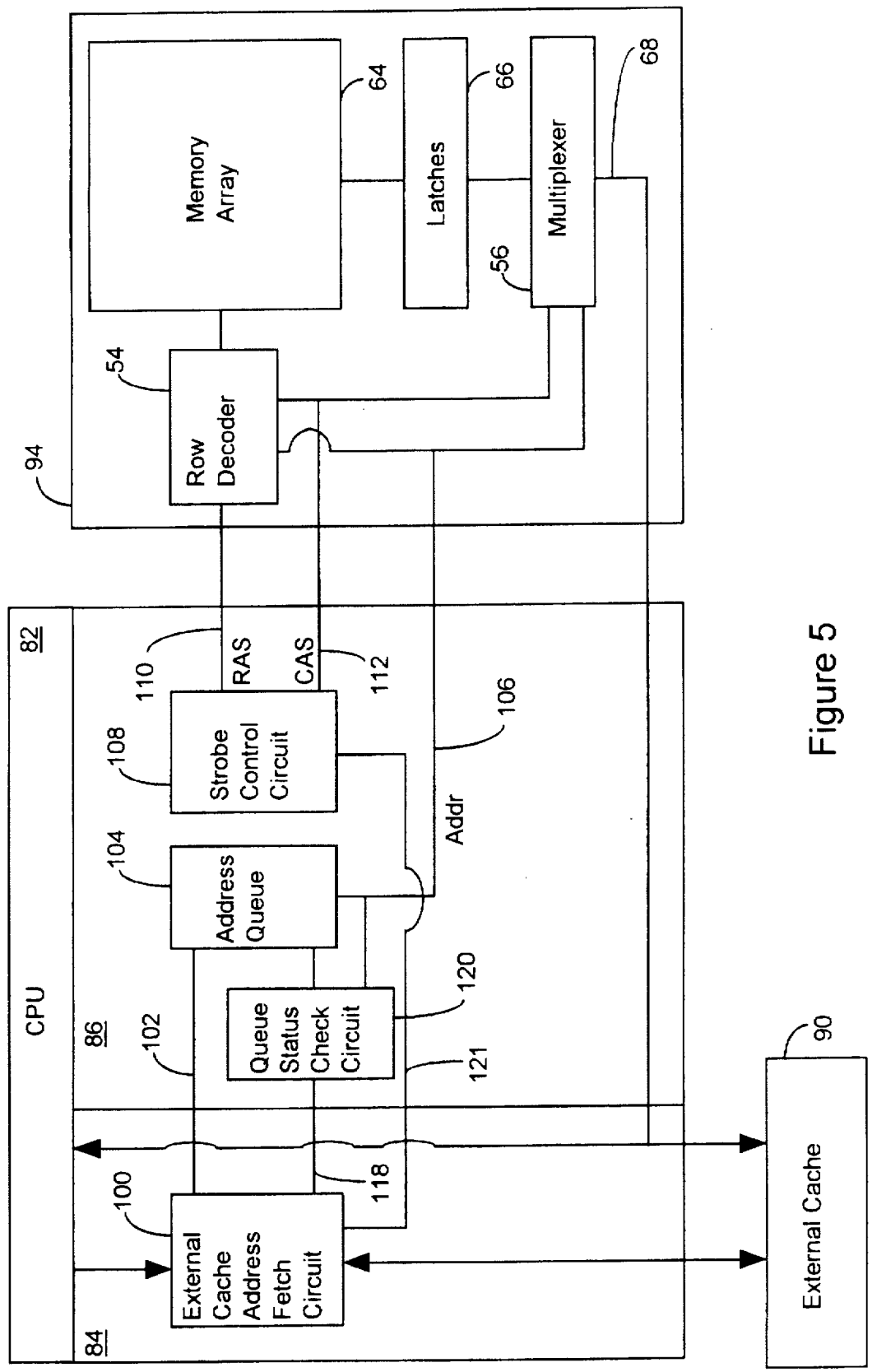
FIG. 5 illustrates an external cache controller and a primary memory controller in accordance with an embodiment of the invention.

FIG. 5 illustrates a CPU 82 including an on-board external cache controller 84 and primary memory controller 86 in accordance with an embodiment of the invention. The CPU 82 delivers address requests to the external cache address fetch circuit 100. Consistent with prior art techniques, the address fetch circuit 100 queries the external cache 90 for the specified address request. If the specified address exists in the external cache 90, then it is routed to the CPU 82 for processing. If the specified address request does not exist in the external cache 90 (a cache miss), then the specified address is passed to the address queue 104 over line 102. As will be described below, in accordance with the invention, an address is only passed over the line 102 if a speculative primary memory access could not be performed. If an address does reach the address queue 104 in this manner, it is processed in accordance with the techniques described in reference to FIG. 2.

The invention can utilize a standard primary memory 94 configuration and external cache configuration 90. However, in accordance with an embodiment of the invention, a novel external cache address fetch circuit 100, queue status check circuit 120, and strobe control circuit 108 are utilized. Attention turns to the operation of these components.

As indicated above, the external cache address fetch circuit 100 receives an address request from the CPU 82. This address request is then routed to the external cache 90, in accordance with prior art techniques. However, in accordance with the invention, the fetch circuit 100 is also configured to release the same address request to the queue status check circuit 120.

When the queue status check circuit 120 receives an address request, it checks the status of the address queue 104. If the address queue 104 is empty, this indicates that the primary memory is free. In response to this condition, the check circuit 120 generates a primary memory free signal. The primary memory free signal allows the address request to be released onto the signal bus 106.

Thus, the external cache address fetch circuit 100 of the invention performs two operations. First, it releases an address request to the external cache 90, consistent with prior art techniques. It also releases the address request to the queue status check circuit 120 of the primary memory controller 86. The queue status check circuit 120 determines whether the primary memory is free. if so, it initiates a speculative primary memory access, by placing the address request on the bus 106. This speculative primary memory access is initiated during the external cache latency period when the external cache 90 is processing the same address request.

Thus, the present invention exploits the close coupling between of the external cache controller 84 and the primary memory controller 86 on the CPU 82. In this way, the primary memory controller 86 can perform a speculative primary memory access during the external cache latency period. This operation is achieved without additional traffic on the system bus 98. In addition, dedicated signal lines into the CPU 82 are not required.

When the external cache latency period is completed, the external cache address fetch circuit 100 will generate either a cache hit or a cache miss signal. In accordance with the invention, this signal is applied to the line 121, which is connected to the strobe control circuit 108. In the case of a cache hit, the data does not have to be retrieved from primary memory. Thus, the strobe control circuit responds to the cache hit signal by keeping the RAS and CAS signals asserted. Thus, the address released to the bus 106 is never processed by the row decoder 54 or the multiplexer 56.

In the case of a cache miss, the strobe control circuit responds to the cache miss signal by deasserting the RAS and CAS signals. Thus, the address speculatively released to the bus 106 is processed. Note in this case that the address request to be processed is already available at the row decoder. Thus, unlike the prior art where there is a delay in passing a cache miss address from the external cache controller 84, to the primary memory controller 86, to the primary memory 94, the speculative initiation of the primary memory access has eliminated this delay.

As indicated above, the speculative initiation of the primary memory access is only commenced if the primary memory is not busy. In other words, real primary memory access requests are never delayed by the speculative primary memory accesses of the invention. Similarly, in accordance with the invention, if a speculative primary memory access has commenced and a non-speculative primary memory access is required, the speculative primary memory access is overwritten by the non-speculative primary memory access. In other words, if a non-speculative address request is received in the address queue 104 during the external cache latency period, the address queue 104 releases the address onto the bus 106, effectively overwriting the speculative memory access. The strobe control circuit 108 then generates appropriate RAS and CAS signals for the non-speculative address request.

Figure 6:
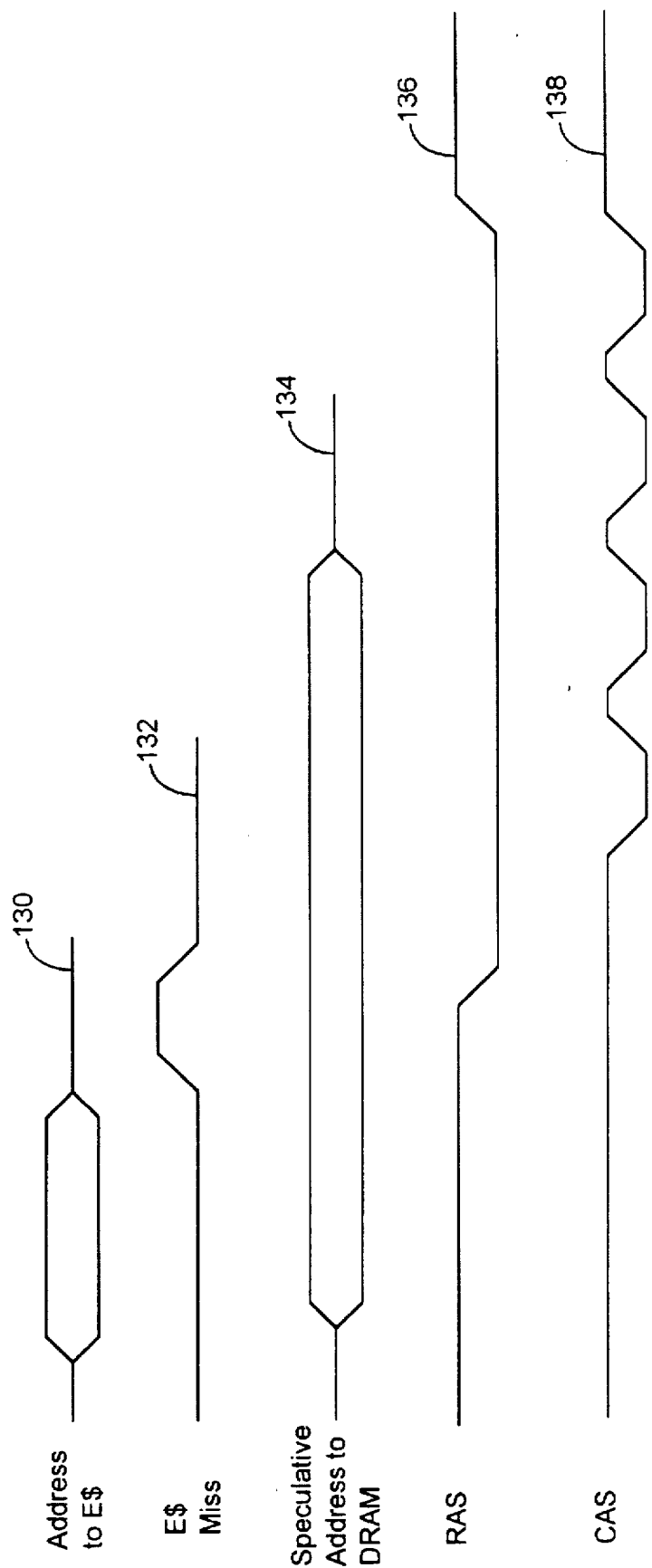
FIG. 6 is a set of waveforms illustrating a speculative primary memory access in accordance with an embodiment of the invention.
Figure 7:
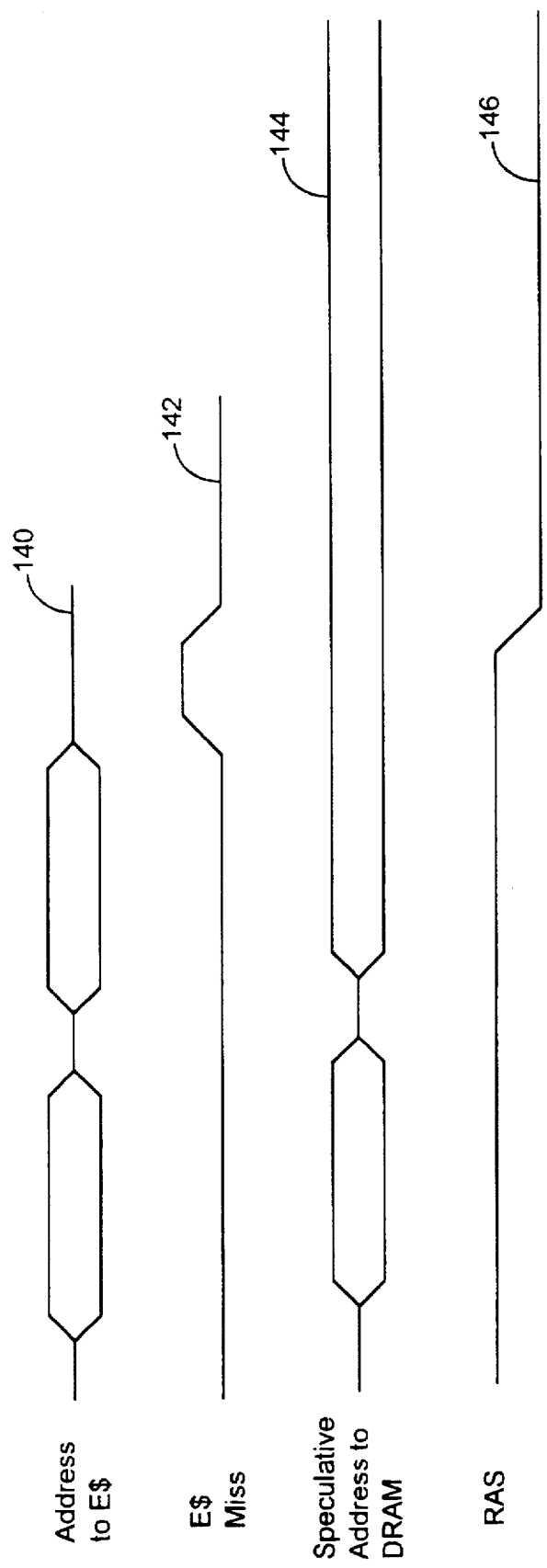
FIG. 7 is a set of waveforms illustrating the non-initiation of a speculative primary memory access in accordance with an embodiment of the invention.
Figure 8:
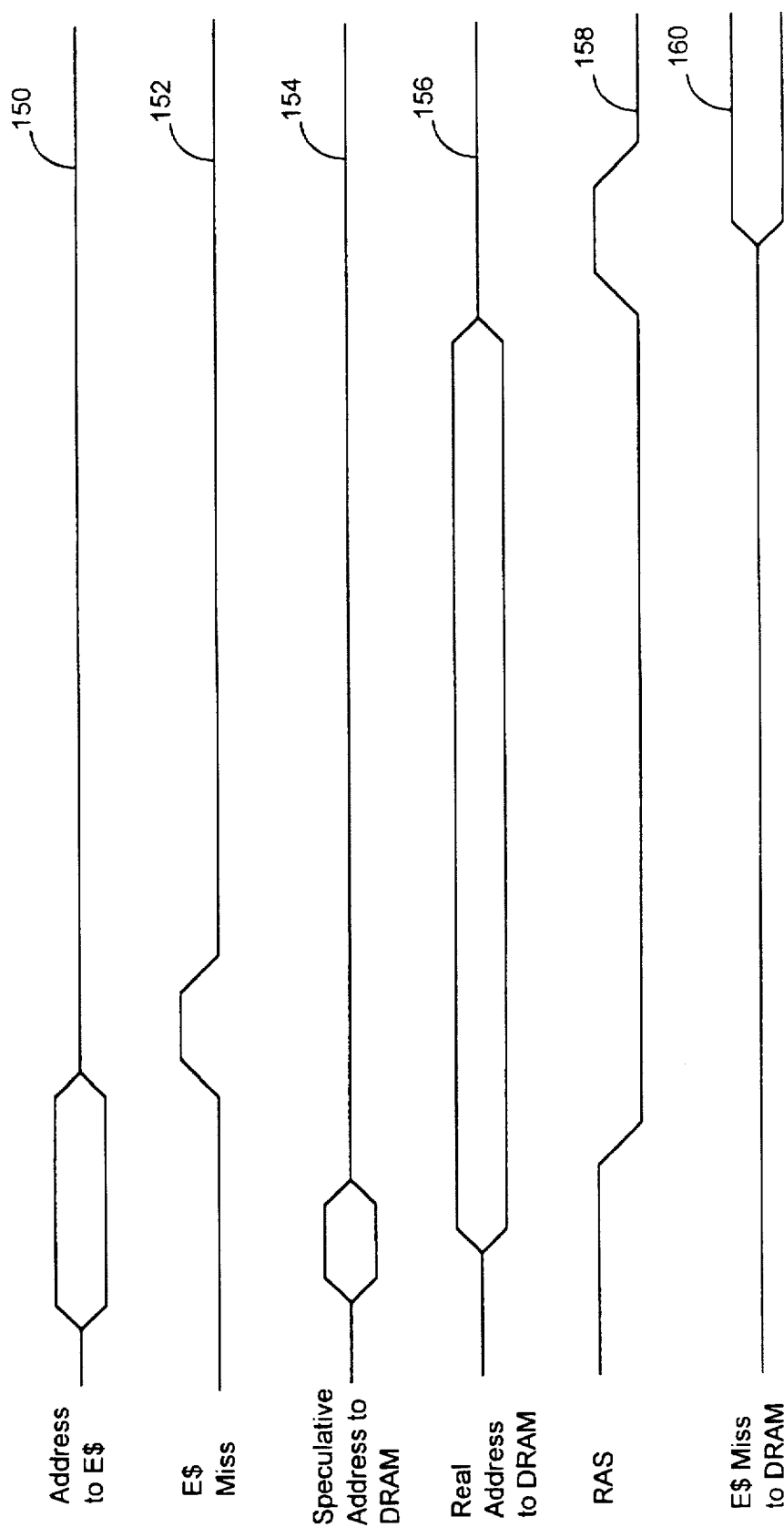
FIG. 8 is a set of waveforms illustrating the aborting of a speculative primary memory access in accordance with an embodiment of the invention.

The foregoing processing of the invention is more fully appreciated with reference to FIGS. 6–8. FIG. 6 illustrates the initiation of a speculative primary memory access and its ultimate completion on a cache miss. Waveform 130 of FIG. 6 shows an address being released to the external cache 90. Waveform 134 illustrates the same address being speculatively released to primary memory (DRAM), as described above. Waveform 132 illustrates an external cache miss signal going from a digital low value (indicating an external cache hit) to a digital high value (indicating an external cache miss). A short time after the external cache miss signal is asserted, the RAS signal, shown with waveform 136, is deasserted. Similarly, the CAS signal, shown with waveform 138, is deasserted a short time later. This allows the processing of the speculative primary memory request of waveform 134.

It can be appreciated in FIG. 6 that the speculative launching of the address request has resulted in substantial time savings. In the absence of the invention, the address request would not be launched until after the external cache miss signal transitioned from low to high, as shown with waveform 132.

The external cache address fetch circuit 100 generates the waveforms 130 and 132 of FIG. 6. The speculative primary memory access of waveform 134 is generated by the queue status check circuit 120. The RAS signal of waveform 136 and the CAS signal of waveform 138 are generated by the strobe control circuit 108 responding to the external cache miss signal (waveform 132).

FIG. 7 illustrates the processing of the invention in response to a cache hit. Waveform 140 illustrates an address being launched to the external cache. Waveform 144 shows a speculative memory access corresponding to the first address of waveform 140. Waveform 142 illustrates that the external cache miss signal remains digitally low in response to the first external cache access. Thus, the speculative primary memory access is disregarded. In particular, the strobe control circuit 108 does not deassert the RAS signal in response to the first external cache address request, as shown in waveform 146.

Waveform 140 also includes a second address request being launched to the external cache. The second address request to external cache is followed by a corresponding speculative access to primary memory, as shown with waveform 144. Waveform 142 illustrates that the second external cache access results in a cache miss (the waveform 142 going from a digital low to a digital high value). Thereafter, the RAS signal is deasserted, as shown with waveform 146 (the CAS signal is omitted for simplicity). This allows the second speculative primary memory access to be processed.

FIG. 8 illustrates the overwriting of a speculative primary memory access when a non-speculative primary memory access request is received. Waveform 150 illustrates an address request being launched to the external cache. Waveform 154 shows the corresponding speculative launching of the address to primary memory. Waveform 156 illustrates a non-speculative or real address being asserted to primary memory shortly after the speculative address of waveform 154. As indicated above, if a non-speculative primary memory access request is received at the address queue 104 when a speculative address request has been launched, the non-speculative address is asserted on the bus 106, effectively overwriting the speculative address request. The RAS signal of waveform 158 shows the deassertion for the non-speculative address request (the CAS signal is omitted for simplicity).

Waveform 152 illustrates that the original external cache access results in a cache miss. Thus, the speculative primary memory access would have been completed, but for the non-speculative primary memory request. The address request for the external cache miss must be processed after the non-speculative primary memory access is completed. Waveform 158 illustrates that the RAS signal is asserted after the non-speculative primary memory access shown in waveform 156 is completed. Thereafter, the RAS signal is deasserted so that the cache miss address can be processed. Waveform 160 illustrates the assertion of the external cache miss address (of waveform 150) on the bus 106.

As indicated above, if the queue status check circuit 120 generates a busy memory signal because the address queue 104 is not empty, then a speculative primary memory access is never initiated. In this case, if a cache miss occurs, the cache miss address is delivered to the address queue 104 over line 102.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. A central processing unit of a computer, comprising:
   an external cache controller to process an address request during an external cache latency period and selectively generate an external cache miss signal or an external cache hit signal; and
   a primary memory controller to process said address request during said external cache latency period and to selectively complete said address request in response to said external cache miss signal or disregard said address request in response to said external cache hit signal, said primary memory controller including an address queue to store a queued address and a queue status check circuit connected to said external cache controller and said address queue, said queue status check circuit being configured to enable said primary memory controller to process said address request during said external cache latency period only when a queued address does not exist in said address queue.

2. The central processing unit of claim 1 wherein said primary memory controller includes a strobe control circuit responding to said external cache miss signal by deasserting a Row Access Strobe (RAS) signal and deasserting a set of Column Access Strobe (CAS) signals corresponding to said address request.

3. The central processing unit of claim 1 wherein said primary memory controller includes a strobe control circuit responding to said external cache hit signal by maintaining an asserted Row Access Strobe (RAS) signal to disregard said address request.

4. The central processing unit of claim 1 wherein said primary memory controller includes a strobe control circuit that responds to a new address request received in said address queue during said cache latency period by deasserting a Row Access Strobe (RAS) signal and deasserting a set of Column Access Strobe (CAS) signals corresponding to said new address request.

5. The central processing unit of claim 1 in combination with an external cache memory connected to said external cache controller.

6. The central processing unit of claim 1 in combination with a primary memory connected to said primary memory controller.

7. The central processing unit of claim 1 in combination with a system bus.

8. The central processing unit of claim 7 in combination with a plurality of input/output controllers connected to said system bus.

9. A method speculatively initiating a data access to primary memory, said method comprising the steps of:
   processing an address request during an external cache latency period to selectively generate an external cache miss signal or an external cache hit signal;
   commencing a primary memory access with said address request during said external cache latency period;
   completing said primary memory access only in response to said external cache miss signal;
   generating a primary memory busy signal when a primary memory access demand exists at the beginning of said external cache latency period; and
   skipping said commencing step and said completing step in response to said primary memory busy signal.

10. The method of claim 9 wherein said completing step includes the steps of:
    deasserting a Row Access Strobe (RAS) signal; and
    deasserting a set of Column Access Strobe (CAS) signals corresponding to said address request.

11. The method of claim 9 wherein said generating step includes the step of generating said primary memory busy signal when a primary memory address queue is occupied at the beginning of said external cache latency period.

12. The method of claim 9 further comprising the steps of:
    executing said processing step with an external cache controller formed on a central processing unit; and
    performing said commencing and completing steps with a primary memory controller formed on said central processing unit.

13. A method speculatively initiating a data access to primary memory, said method comprising the steps of:
    processing an address request during an external cache latency period to selectively generate an external cache miss signal or an external cache hit signal;
    commencing a primary memory access with said address request during said external cache latency period;
    completing said primary memory access only in response to said external cache miss signal;
    generating a primary memory busy signal when a primary memory access demand exists during said external cache latency period; and
    skipping said completing step in response to said primary memory busy signal.

14. The method of claim 13 wherein said generating step includes the step of generating said primary memory busy signal when a primary memory address queue becomes occupied during said external cache latency period.

* * * * *